(12) United States Patent
Matsubara

(10) Patent No.: US 10,291,175 B2
(45) Date of Patent: May 14, 2019

(54) ROTARY ELECTRIC MACHINE SYSTEM

(71) Applicant: TOYOTA JIDOSHA KABUSHIKI KAISHA, Toyota-shi, Aichi-ken (JP)

(72) Inventor: Tomoya Matsubara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 15/659,717

(22) Filed: Jul. 26, 2017

(65) Prior Publication Data

US 2018/0091086 A1     Mar. 29, 2018

(30) Foreign Application Priority Data

Sep. 29, 2016  (JP) ................................. 2016-191987

(51) Int. Cl.
| | |
|---|---|
| H02K 5/16 | (2006.01) |
| H02P 31/00 | (2006.01) |
| H02K 7/08 | (2006.01) |
| B60L 3/00 | (2019.01) |
| H02P 29/024 | (2016.01) |
| H02K 11/21 | (2016.01) |

(52) U.S. Cl.
CPC ............ *H02P 31/00* (2013.01); *B60L 3/0061* (2013.01); *H02K 7/08* (2013.01); *H02K 11/21* (2016.01); *H02P 29/024* (2013.01); *Y02T 10/641* (2013.01); *Y02T 10/642* (2013.01)

(58) Field of Classification Search
CPC ........ H02K 7/08; H02K 11/21; H02P 29/024; Y02T 10/641; Y02T 10/6421

USPC ......................................................... 310/90
See application file for complete search history.

(56) References Cited

U.S. PATENT DOCUMENTS

| | | | | |
|---|---|---|---|---|
| 5,726,511 | A  * | 3/1998 | Kusase .................... | H02K 5/10 310/52 |
| 7,944,106 | B2 * | 5/2011 | Miller ...................... | B60K 6/26 310/112 |
| 7,976,687 | B2 * | 7/2011 | Sato ..................... | C25D 7/0614 204/279 |
| 8,675,304 | B2 * | 3/2014 | Tamaoka .............. | F16C 17/107 310/67 R |

(Continued)

FOREIGN PATENT DOCUMENTS

| | | |
|---|---|---|
| JP | 2008-179189 A | 8/2008 |
| JP | 2015-159647 A | 9/2015 |

(Continued)

*Primary Examiner* — Thanh Lam
(74) *Attorney, Agent, or Firm* — Oliff PLC

(57) ABSTRACT

A rotary electric machine system includes: a rotary electric machine; a lubrication mechanism configured to supply lubricating oil to a bearing of the rotary electric machine; and a control unit configured to control the supply of lubricating oil from the lubrication mechanism. The control unit is configured to acquire an operation status of the rotary electric machine and determine whether there is a possibility of occurrence of electrolytic corrosion in the bearing. The control unit is configured to, when it is determined that there is a possibility of occurrence of electrolytic corrosion, increase the supply of lubricating oil to the bearing by controlling the lubrication mechanism as compared to the supply of lubricating oil to the bearing at a time when it is not determined that there is a possibility of occurrence of electrolytic corrosion.

7 Claims, 10 Drawing Sheets

(56) References Cited

U.S. PATENT DOCUMENTS 8,736,122 B2 * 5/2014 Kamp ................... H02K 5/161
310/58
2015/0307078 A1 10/2015 Watanabe et al.

FOREIGN PATENT DOCUMENTS

JP 2015-211582 A 11/2015
JP 2016-146691 A 8/2016

* cited by examiner

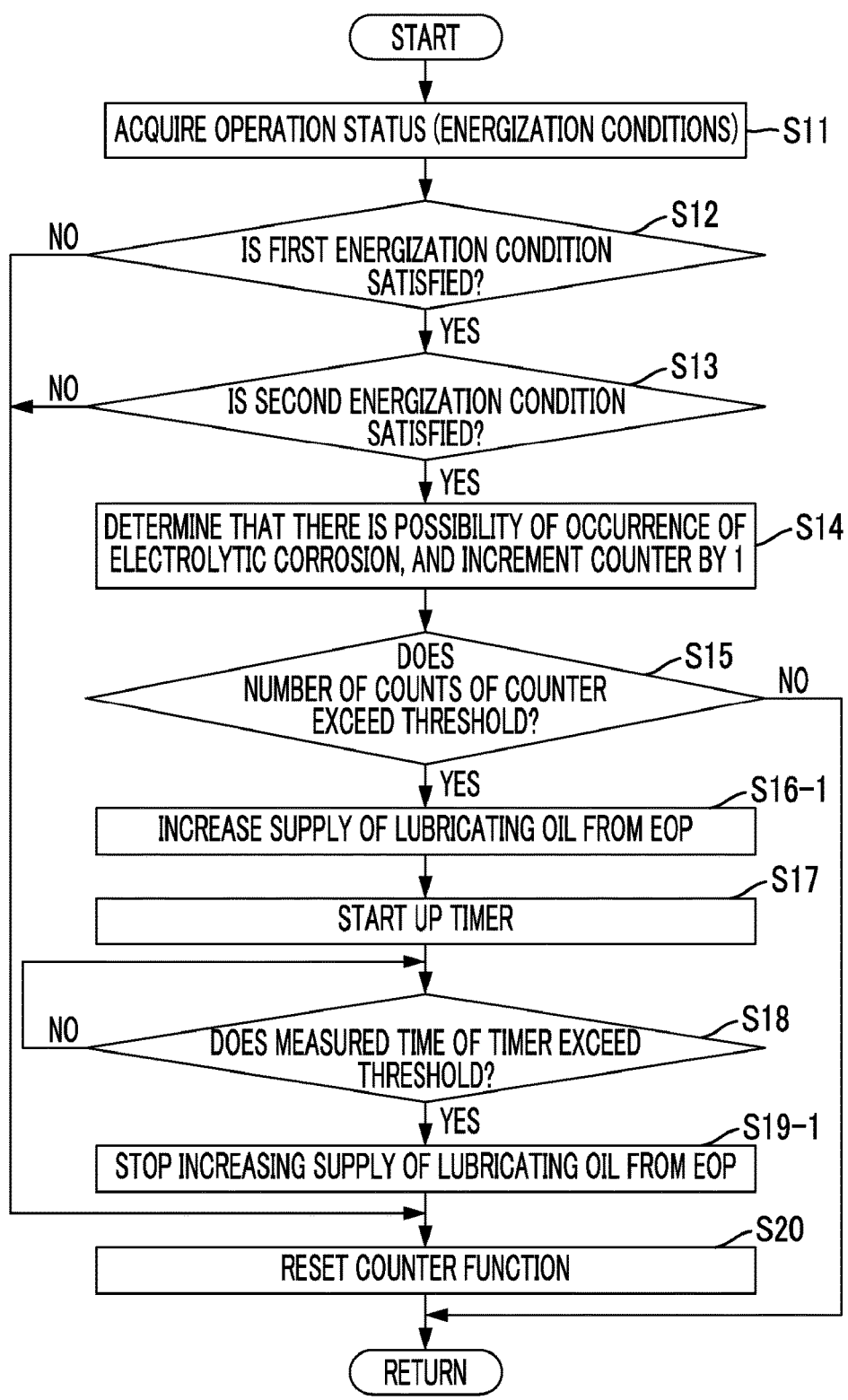

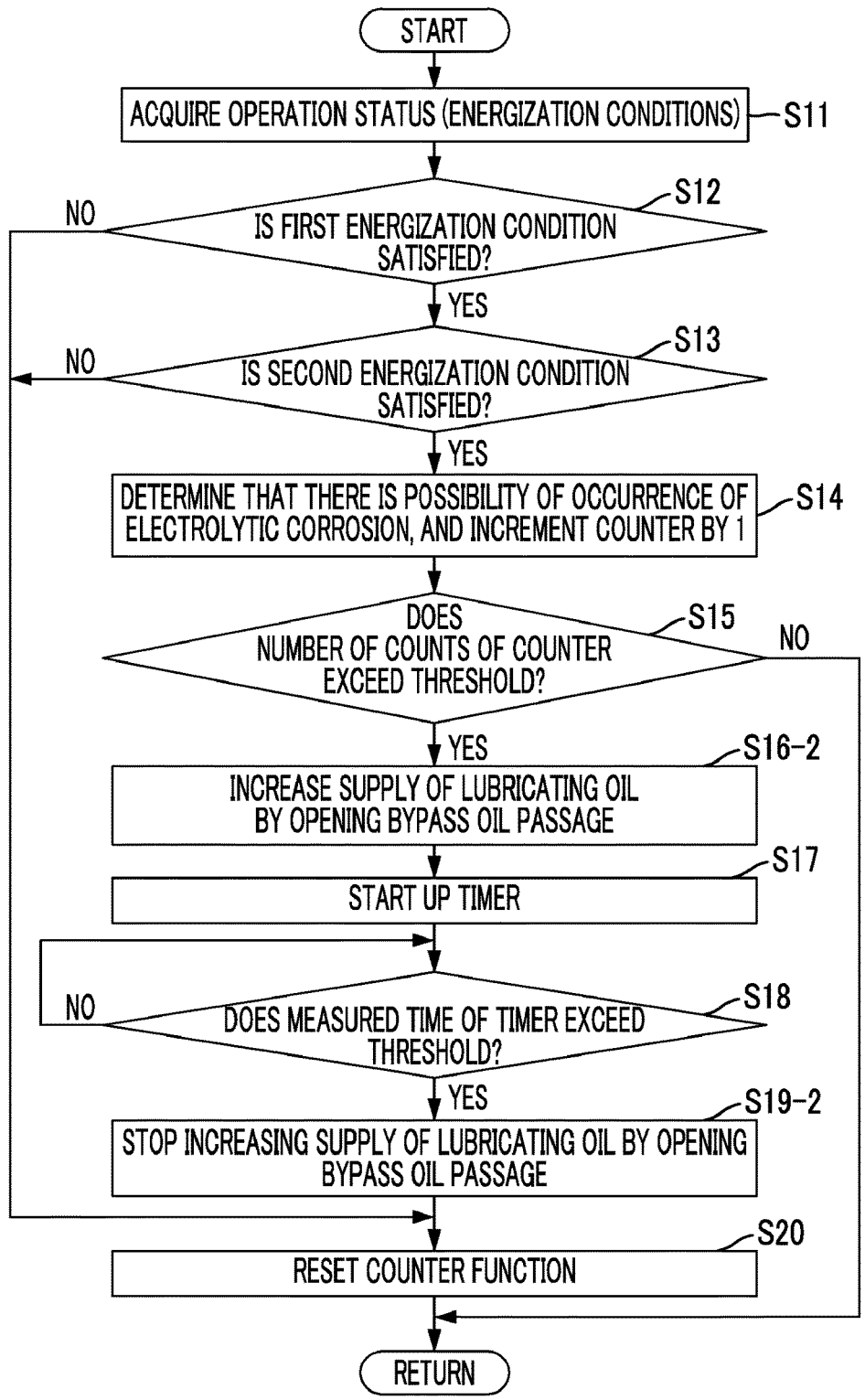

ROTARY ELECTRIC MACHINE SYSTEM

INCORPORATION BY REFERENCE

The disclosure of Japanese Patent Application No. 2016-191987 filed on Sep. 29, 2016 including the specification, drawings and abstract is incorporated herein by reference in its entirety.

BACKGROUND

1. Technical Field

The disclosure relates to a rotary electric machine system that prevents occurrence of electrolytic corrosion in a bearing of a rotary electric machine.

2. Description of Related Art

A rotary electric machine that is driven by using electric power is mounted on various devices and used. In a rotary electric machine of this type, induced electromotive force can be generated at a rotor side due to fluctuations in magnetic field resulting from supply of electric power to a stator side, with the result that a potential difference can occur between a rotor shaft and a peripheral member of the rotor shaft. For this reason, if an electrical closed circuit that passes from a rotor core to the rotor shaft is formed, including a bearing that has the rotor shaft rotatably supported on the peripheral member, there is a concern about occurrence of electrolytic corrosion, such as surface roughness, caused by, for example, a spark that is developed on the bearing.

For example, Japanese Patent Application Publication No. 2015-159647 (JP 2015-159647 A) describes the following configuration. An electrical insulating film is provided between a rotor shaft and a rotor core in a rotary electric machine mounted on a vehicle. This interrupts leakage current and, as a result, restricts formation of a closed circuit, and also reduces occurrence of electrolytic corrosion in a bearing.

SUMMARY

However, in the rotary electric machine described in JP 2015-159647 A, it is possible to restrict formation of the closed circuit that passes through the rotor core but it is not possible to restrict formation of a closed circuit in which the bearing is interposed between the rotor shaft and another peripheral member without passing through the rotor core. As a result, there has been a possibility of occurrence of electrolytic corrosion in the bearing.

The disclosure provides a rotary electric machine system that is able to simply ensure the electrical insulating property of a bearing for a rotor shaft of a rotary electric machine.

An aspect of the disclosure provides a rotary electric machine system. The rotary electric machine system includes: a rotary electric machine including a stator and a rotor, a rotor shaft fixed to the rotor being rotatably supported by a case via a bearing; a lubrication mechanism configured to supply lubricating oil to the bearing of the rotary electric machine; and a control unit configured to control the supply of lubricating oil from the lubrication mechanism. The control unit is configured to acquire an operation status of the rotary electric machine and determine whether there is a possibility of occurrence of electrolytic corrosion in the bearing. The control unit is configured to, when it is determined that there is a possibility of occurrence of electrolytic corrosion, increase the supply of lubricating oil to the bearing by controlling the lubrication mechanism as compared to the supply of lubricating oil to the bearing at a time when it is not determined that there is a possibility of occurrence of electrolytic corrosion.

According to the above aspect of the disclosure, at the timing at which it is determined that the rotary electric machine system is placed in an operation state where there is a possibility of occurrence of electrolytic corrosion in the bearing, the supply of lubricating oil to the bearing is increased, and the amount of lubricating oil on the bearing surface is increased. For this reason, the supply of lubricating oil is not unnecessarily increased, and the amount of lubricating oil between the bearing surfaces of the bearing is increased at necessary timing, so the electrical insulating property provided by the lubricating oil is increased.

Therefore, it is possible to provide the rotary electric machine system that is able to ensure the electrical insulating property at the bearing with high reliability with the use of simple control for just increasing the supply of lubricating oil to the bearing as needed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart that illustrates a control process for supplying lubricating oil to the bearings of the rotary electric machines;

FIG. 8 is a flowchart different from that of FIG. 5, and illustrates a control process for supplying lubricating oil to the bearings of the rotary electric machines;

DETAILED DESCRIPTION OF EMBODIMENTS

Figure 1:
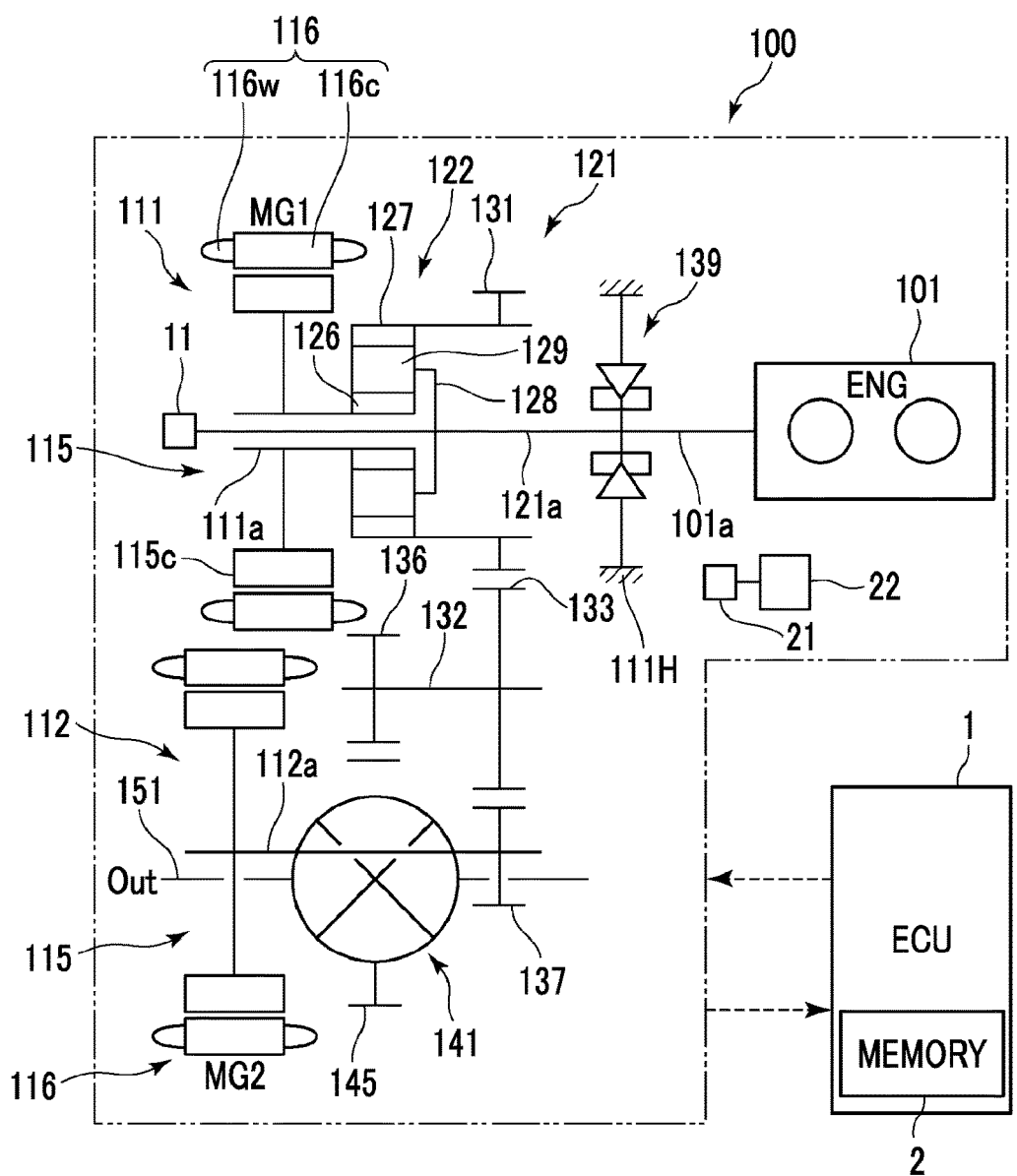
FIG. 1 is a view that shows an example of a vehicle on which a rotary electric machine system according to a first embodiment of the disclosure is mounted, and is a schematic view that shows the schematic overall configuration of the vehicle.

Hereinafter, embodiments of the disclosure will be described in detail with reference to the accompanying drawings. FIG. 1 to FIG. 6D are views that illustrate a rotary electric machine system according to a first embodiment of the disclosure. FIG. 1 is a view that shows an example of a vehicle on which the rotary electric machine system is mounted.

First Embodiment

As shown in FIG. 1, the vehicle 100 is a so-called hybrid vehicle on which an internal combustion-type engine 101 and rotary electric machines 111, 112 are mounted as power sources. Each of the rotary electric machines 111, 112 functions as a motor generator (MG). That is, the vehicle 100 includes the rotary electric machine system according to the present embodiment. The vehicle 100 is configured such that the overall vehicle is controlled by an electronic control unit (ECU) 1 and, for example, these engine 101 and rotary electric machines 111, 112 are efficiently driven. The power of these engine 101 and rotary electric machines 111, 112 is transmitted to drive shafts 151 via a power transmission mechanism 121, and the like. The power transmission mechanism 121 has the function of a differential device. Thus, wheels (not shown) are rotated, and the vehicle 100 travels.

The engine 101 converts the combustion energy of fuel to rotational driving force and outputs the rotational driving force as power. Each of the rotary electric machines 111, 112 is rotationally driven and outputs power when supplied with alternating-current power converted by an inverter from direct-current power energy stored in a battery (not shown). Each of the rotary electric machines 111, 112 is configured to be able to operate as an electric motor that is driven when supplied with electric power from the battery and also operate as a generator that generates and outputs regenerative electric power for charging the battery during deceleration, or the like.

Each of the rotary electric machines 111, 112 includes a rotor 115 and a stator 116. The rotor 115 has a rotor core 115c. The stator 116 has a stator core 116c on which a stator coil 116w is wound. The rotor 115 is rotatably accommodated inside the stator 116. In the rotary electric machine 111, the rotor core 115c is fixed to the rotor shaft 111a so as to rotate integrally with the rotor shaft 111a. In the rotary electric machine 112, the rotor core 115c is fixed to the rotor shaft 112a so as to rotate integrally with the rotor shaft 112a.

The power transmission mechanism 121 includes a single pinion-type planetary gear 122. The planetary gear 122 includes a sun gear 126, a ring gear 127, a carrier 128 and pinion gears 129. The sun gear 126, the ring gear 127, the carrier 128 and the pinion gears 129 differentially rotate. The power transmission mechanism 121 includes an input shaft 121a having the same rotation axis as an output shaft 101a of the engine 101. In the power transmission mechanism 121, the carrier 128 is coaxially coupled to the input shaft 121a so as to rotate integrally with the input shaft 121a, and the sun gear 126 is coaxially coupled to the rotor shaft 111a of the rotary electric machine (MG1) 111 so as to rotate integrally with the rotor shaft 111a. In the power transmission mechanism 121, the carrier 128 supports the plurality of pinion gears 129 such that the pinion gears 129 are rotatable, and the ring gear 127 accommodates these pinion gears 129 on the radially inner side and is in mesh with these pinion gears 129. Each of the pinion gears 129 rotates or revolves around the sun gear 126 to epicyclically rotate. Thus, in the power transmission mechanism 121, the ring gear 127 is assembled to the concentric sun gear 126 via the pinion gears 129 so as to coaxially rotate with the sun gear 126.

A one-way brake 139 is installed between the output shaft 101a of the engine 101 and the input shaft 121a of the power transmission mechanism 121. The one-way brake 139 is fixed to a housing 111H. The one-way brake 139 is configured to stop the rotation of the carrier 128 of the power transmission mechanism 121 by fixedly engaging with the output shaft 101a so as to restrict rotation in a direction opposite to the rotational direction of the engine 101.

In the power transmission mechanism 121, an external gear train, and the like, are coupled to a drive gear 131 such that power is transmitted. The drive gear 131 is an external gear. The drive gear 131 is formed at the outer peripheral side of the ring gear 127, and integrally rotates with the ring gear 127. A counter shaft 132 is rotatably installed parallel to the input shaft 121a of the power transmission mechanism 121. A counter driven gear 133 is fixed to one end of the counter shaft 132 so as to rotate integrally with the counter shaft 132. The counter driven gear 133 is in mesh with the drive gear 131 provided at the outer peripheral side of the ring gear 127. A counter drive gear 136 is fixed to the other end of the counter shaft 132 so as to rotate integrally with the counter shaft 132. A reduction gear 137 is in mesh with the counter driven gear 133 provided at one end of the counter shaft 132. The reduction gear 137 is fixed to an end of the rotor shaft 112a of the rotary electric machine (MG2) 112. A ring gear 145 of a differential gear 141 is in mesh with the counter drive gear 136 provided at the other end of the counter shaft 132. Thus, the counter drive gear 136 is coupled to the drive shafts 151.

With this structure, the vehicle 100 is able to cause the rotational power of the engine 101, rotary electric machine 111 or rotary electric machine 112 to be output from the corresponding output shaft 101a, rotor shaft 111a or rotor shaft 112a. The rotational power to be output is able to cause the wheels (not shown) to roll when transmitted to the drive shafts 151 via the power transmission mechanism 121, thus making it possible to cause the vehicle 100 to travel.

The vehicle 100 includes a mechanical oil pump (hereinafter, also simply referred to as MOP) 11 and an electric oil pump (hereinafter, also simply referred to as EOP) 21 in order to supply lubricating oil to lubricated portions that require cooling or lubrication in the rotary electric machines 111, 112, the power transmission mechanism 121, and the like.

The MOP 11 is installed so as to be directly coupled to the output shaft 101a of the engine 101 and driven by the engine 101. The MOP 11 is operated simultaneously with startup of the engine 101, and starts supplying lubricating oil to the rotary electric machines 111, 112, and the like.

The EOP 21 is installed so as to be operable independently of the engine 101. A pump portion (not shown) of the EOP 21 is driven to operate by a motor 22, and starts supplying lubricating oil to the rotary electric machines 111, 112, and the like. The motor 22 is driven when supplied with electric power stored in a battery (not shown). That is, the MOP 11 is not operable during a stop of the engine 101, but the EOP 21 is able to operate and supply lubricating oil to the rotary electric machines 111, 112, and the like, even during a stop of the engine 101.

Figure 2:
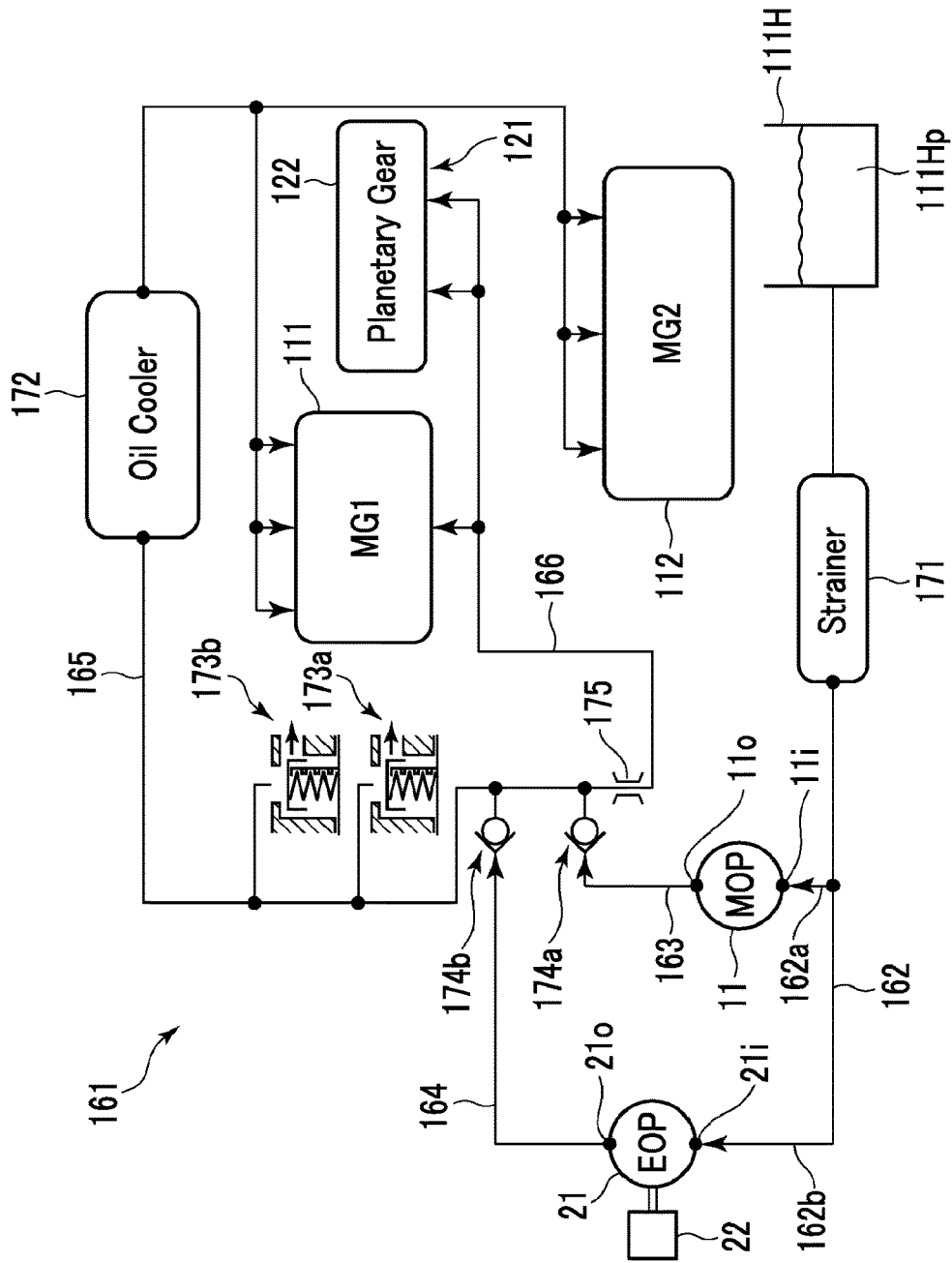
FIG. 2 is a systematic diagram that illustrates oil passages for supplying lubricating oil to bearings of rotary electric machines.

These MOP 11 and EOP 21 are incorporated in a hydraulic circuit 161 shown in FIG. 2, and each are configured so as to supply lubricating oil to the lubricated portions of the rotary electric machines 111, 112, and the like. The hydraulic circuit 161 includes a suction oil passage 162, a first distributing oil passage 163, a second distributing oil passage 164, a first supply oil passage 165 and a second supply oil passage 166.

The suction oil passage 162 is connected to a reservoir 111Hp via a strainer 171. The reservoir 111Hp is installed at the bottom inside the housing 111H, and stores lubricating oil. Branch passages 162a, 162b that branch off from the strainer 171 are respectively connected to a suction port 11i of the MOP 11 and a suction port 21i of the EOP 21. Thus, the MOP 11 and the EOP 21 each are able to draw and discharge lubricating oil strained by the strainer 171.

The first distributing oil passage 163 is connected to a discharge port 11o of the MOP 11. The first supply oil passage 165 and the second supply oil passage 166 are connected to the first distributing oil passage 163 so as to branch off from the first distributing oil passage 163. Similarly, the second distributing oil passage 164 is connected to a discharge port 21o of the EOP 21. The first supply oil passage 165 and the second supply oil passage 166 are connected to the second distributing oil passage 164 so as to branch off from the second distributing oil passage 164. That is, the first supply oil passage 165 and the second supply oil passage 166 communicate with each of the first distributing oil passage 163 and the second distributing oil passage 164 at the corresponding connecting portion, and are connected to each of the first distributing oil passage 163 and the second distributing oil passage 164 in parallel with each other. Thus, the MOP 11 is able to feed lubricating oil under pressure to the first supply oil passage 165 and the second supply oil passage 166 via the first distributing oil passage 163, and the EOP 21 is able to feed lubricating oil under pressure to the first supply oil passage 165 and the second supply oil passage 166 via the second distributing oil passage 164.

The rotary electric machine 111 and the rotary electric machine 112 are connected to the first supply oil passage 165 in parallel with each other at the other end opposite to the end to which the first distributing oil passage 163 and the second distributing oil passage 164 are connected in parallel with each other. Similarly, the rotary electric machine 111 and the power transmission mechanism 121 are connected to the second supply oil passage 166 in parallel with each other at the other end opposite to the end to which the first distributing oil passage 163 and the second distributing oil passage 164 are connected in parallel with each other.

Thus, the rotary electric machine (MG1) 111, the rotary electric machine (MG2) 112 and the power transmission mechanism 121 receive via the first supply oil passage 165 and the second supply oil passage 166 lubricating oil that is discharged from the MOP 11 or the EOP 21 and fed under pressure to the first distributing oil passage 163 or the second distributing oil passage 164. As a result, the lubricated portions of these rotary electric machine (MG1) 111, rotary electric machine (MG2) 112 and power transmission mechanism 121 are, for example, lubricated. At this time, in the power transmission mechanism 121, particularly, the planetary gear 122 including the sun gear 126, and the like, is supplied with lubricating oil and is, for example, lubricated. The rotary electric machine (MG1) 111 is supplied with lubricating oil from both the first supply oil passage 165 and the second supply oil passage 166 and is, for example, lubricated.

The hydraulic circuit 161 is configured to effectively obtain cooling effect from lubricating oil by interposing an oil cooler 172 in the first supply oil passage 165. Of course, an oil cooler may also be interposed in the second supply oil passage 166.

Relief valves 173a, 173b are installed in the first supply oil passage 165. Each of the relief valves 173a, 173b functions when lubricating oil has a pressure equal to or higher than a certain pressure. Thus, each of the relief valves 173a, 173b prevents damage to the downstream-side rotary electric machines 111, 112. Each of the relief valves 173a, 173b has a set operating pressure such that one constantly functions and the other auxiliary functions.

A check valve 174a is installed in the first distributing oil passage 163 on the discharge side of the MOP 11 at a portion upstream of a portion at which the first supply oil passage 165 and the second supply oil passage 166 branch off. A check valve 174b is installed in the second distributing oil passage 164 on the discharge side of the EOP 21 at a portion upstream of a portion at which the first supply oil passage 165 and the second supply oil passage 166 branch off. Each of the check valves 174a, 174b permits flow of lubricating oil only in one direction. The check valve 174a restricts backflow of lubricating oil from the first supply oil passage 165 or the second supply oil passage 166 to the first distributing oil passage 163. The check valve 174b restricts backflow of lubricating oil from the first supply oil passage 165 or the second supply oil passage 166 to the second distributing oil passage 164. Thus, the check valves 174a, 174b prevent damage to the MOP 11 and the EOP 21.

An orifice 175 is installed in the second supply oil passage 166 at a position downstream of the check valves 174a, 174b. The orifice 175 reduces fluctuations in the flow rate of lubricating oil that is supplied to the second supply oil passage 166. Thus, lubricating oil is preferentially supplied to the rotary electric machines 111, 112 via the first supply oil passage 165.

Figure 3:
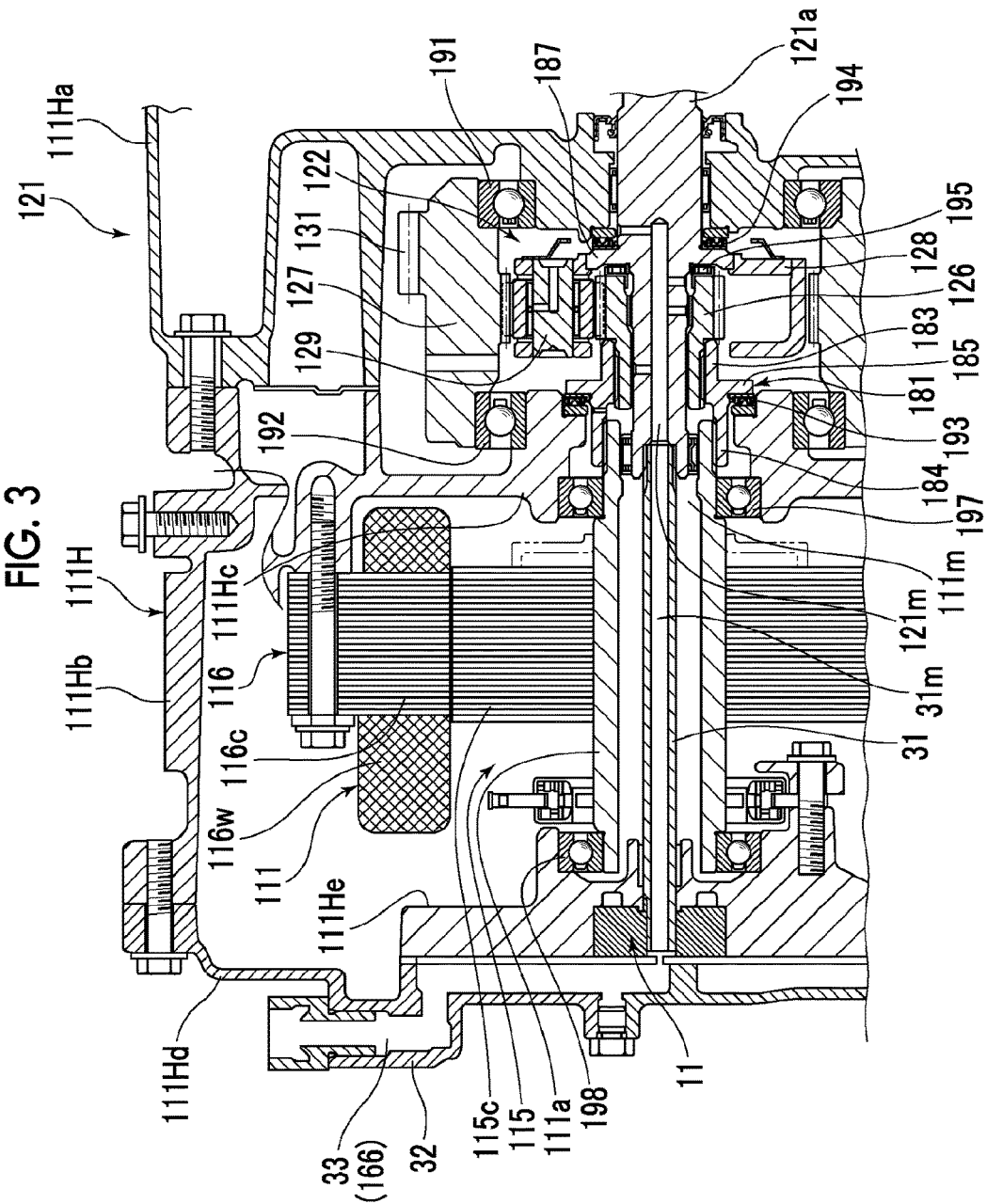
FIG. 3 is a longitudinal sectional view that illustrates the structure of a mechanism including one of the rotary electric machines.

Incidentally, as shown in FIG. 3, the rotary electric machine 111 according to the present embodiment is arranged across the planetary gear 122 of the power transmission mechanism 121 from the engine 101, and the rotor shaft 111a is rotatably supported by the housing 111H so as to be coaxial with the output shaft 101a of the engine 101 and the input shaft 121a of the power transmission mechanism 121.

The housing 111H includes a front member 111Ha, a body member 111Hb, a partition member 111Hc, a rear member 111Hd and a pump housing 111He. The housing 111H is formed so as to accommodate the rotary electric machine 111 and the planetary gear 122 of the power transmission mechanism 121.

The front member 111Ha has a closed-end cylindrical shape such that an accommodation space for the planetary gear 122 is provided around the input shaft 121a of the power transmission mechanism 121. The input shaft 121a is coupled to the output shaft 101a of the engine 101. The partition member 111Hc is assembled to a cylindrical open end of the front member 111Ha by screws. As a result, the front member 111Ha accommodates the input shaft 121a of the power transmission mechanism 121 in a state where the input shaft 121a extends through the center of the cylindrical front member 111Ha so as to be rotatable, and the accommodation space is closed.

The body member 111Hb has substantially a cylindrical shape such that an accommodation space having such a diameter that the rotor 115 and stator 116 of the rotary electric machine 111 are allowed to be accommodated in the accommodation space. The partition member 111Hc and both the rear member 111Hd and the pump housing 111He are respectively assembled to both ends of the cylindrical body member 111Hb by screws. Thus, the accommodation space of the body member 111Hb is closed.

The partition member 111Hc is assembled to the front member 111Ha. The partition member 111Hc allows the coupling portion of the input shaft 121a of the power transmission mechanism 121 with the rotor shaft 111a of the rotary electric machine 111 to extend therethrough and supports the coupling portion so as to be rotatable. The partition member 111Hc closes the accommodation space for the planetary gear 122. The stator core 116c of the stator 116 of the rotary electric machine 111 inside the body member 111Hb is fixed to the partition member 111Hc by screws.

The rear member 111Hd has a flat ring shape such that the substantially disc-shaped pump housing 111He is allowed to be connected to the center of the rear member 111Hd. The outer peripheral side of the rear member 111Hd is screwed to one end of the body member 111Hb so as to face the partition member 111Hc. The rear member 111Hd closes the body member 111Hb together with the pump housing 111He.

The pump housing 111He is fixed to the axis side of the rear member 111Hd. The pump housing 111He supports the rotor shaft 111a of the rotary electric machine 111 such that the rotor shaft 111a is rotatable, and holds the MOP 11 inside such that the MOP 11 rotates coaxially with the rotor shaft 111a of the rotary electric machine 111.

In the power transmission mechanism 121, the sun gear 126, the ring gear 127, the carrier 128, the pinion gears 129 and the drive gear 131 that constitute the planetary gear 122 are arranged around the input shaft 121a. The planetary gear 122 of the power transmission mechanism 121 is accommodated in the space defined by the front member 111Ha and partition member 111Hc of the housing 111H.

The rotor shaft 111a of the rotary electric machine 111 is arranged along the same rotation axis as the input shaft 121a so as to coaxially rotate integrally with the sun gear 126 of the power transmission mechanism 121. The rotor 115 and stator 116 of the rotary electric machine 111 are arranged around the rotor shaft 111a. The rotor 115 and stator 116 of the rotary electric machine 111 are accommodated in the space defined by the body member 111Hb, partition member 111Hc, rear member 111Hd and pump housing 111He of the housing 111H. The stator core 116c of the stator 116 is fixed to the partition member 111Hc of the housing 111H so as to face the rotor core 115c of the rotor 115, and the stator coil 116w that is supplied with electric power from the above-described battery is wound on the stator core 116c.

Figure 4:
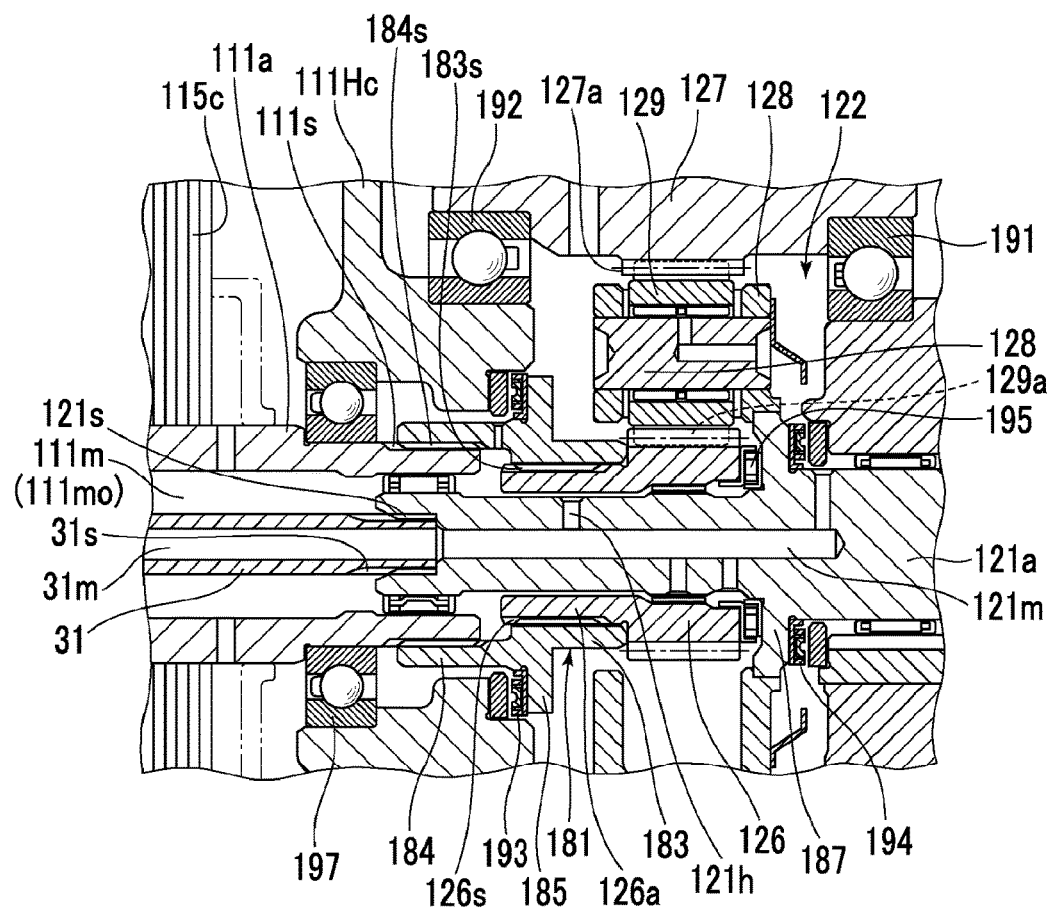
FIG. 4 is a partially enlarged longitudinal sectional view that shows the configuration of a relevant portion in the mechanism shown in FIG. 3.

As shown in FIG. 4 in enlarged view, the sun gear 126 of the planetary gear 122 is supported on the outer periphery of the input shaft 121a of the power transmission mechanism 121 so as to coaxially rotate with the input shaft 121a. The sun gear 126 has a cylindrical portion 126a that extends toward the rotor shaft 111a of the rotary electric machine 111 along the outer periphery of the input shaft 121a of the power transmission mechanism 121. Splines 126s are provided on the outer periphery of the cylindrical portion 126a. Splines 111s are also provided on the outer periphery of the end of the rotor shaft 111a of the rotary electric machine 111. The inner faces of cylindrical portions 183, 184 of a flange-shaped member 181 respectively face the splines 126s of the cylindrical portion 126a of the sun gear 126 and the splines 111s of the end of the rotor shaft 111a. When splines 183s, 184s respectively provided on the inner faces of the cylindrical portions 183, 184 of the flange-shaped member 181 are respectively in mesh with and spline-fitted to the splines 126s of the cylindrical portion 126a of the sun gear 126 and the splines 111s of the end of the rotor shaft 111a, the sun gear 126 of the power transmission mechanism 121 and the rotor shaft 111a of the rotary electric machine 111 are coupled to each other so as to be relatively non-rotatable.

In the power transmission mechanism 121, radial bearings 191, 192 are respectively fitted at positions on both sides of the ring gear 127 in the rotation axis direction such that the radial bearing 191 is interposed between the ring gear 127 and the front member 111Ha of the housing 111H and the radial bearing 192 is interposed between the ring gear 127 and the partition member 111Hc of the housing 111H. The flange-shaped member 181 located on the rotor shaft 111a of the rotary electric machine 111 has a disc-shaped portion 185 that protrudes radially outward. A thrust bearing 193 is fitted between the disc-shaped portion 185 and the partition member 111Hc of the housing 111H. Similarly, the input shaft 121a of the power transmission mechanism 121 has a flange-shaped portion 187 that protrudes in a disc shape from the outer periphery on the side of the output shaft 101a of the engine 101. A thrust bearing 195 is fitted between the side face of the sun gear 126 and the flange-shaped portion 187. A thrust bearing 194 is fitted between the front member 111Ha of the housing 111H and the flange-shaped portion 187. The sun gear 126 and the front member 111Ha are provided on both surface sides of the flange-shaped portion 187. Thus, the power transmission mechanism 121 is rotatably supported such that the power transmission mechanism 121 is positioned in the thrust direction by the radial bearings 191, 192 and the thrust bearings 193, 194, 195 on the outer peripheral side of the input shaft 121a and a sliding load in the thrust direction or the radial direction is reduced.

Similarly, a radial bearing 197 is fitted between the rotor shaft 111a of the rotary electric machine 111 and the partition member 111Hc of the housing 111H, and a radial bearing 198 is fitted between the rotor shaft 111a of the rotary electric machine 111 and the pump housing 111He of the housing 111H. Thus, the rotor shaft 111a of the rotary electric machine 111 is rotatably supported while a sliding load in the radial direction is reduced. That is, the housing 111H including the partition member 111Hc and the pump housing 111He constitutes a case that supports the rotor shaft 111a such that the rotor shaft 111a is rotatable.

Each of the rotor shaft 111a of the rotary electric machine 111 and the input shaft 121a of the power transmission mechanism 121 is formed of a hollow cylindrical member. A drive shaft 31 formed of a similar cylindrical member is accommodated in a hollow space 111m of the rotor shaft 111a of the rotary electric machine 111. Splines 121s are provided on the inner face of the rotary electric machine 111-side end of the input shaft 121a of the power transmission mechanism 121.

Splines 31s are provided on the outer periphery of the power transmission mechanism 121-side end of the drive shaft 31 inside the rotor shaft 111a of the rotary electric machine 111. The splines 31s are in mesh with and spline-fitted to the splines 121s of the rotary electric machine 111-side end of the input shaft 121a of the power transmission mechanism 121. The other end of the drive shaft 31, opposite from the splines 31s, is rotatably supported by the pump housing 111He. Thus, the drive shaft 31 is integrally rotated coaxially with the input shaft 121a of the power transmission mechanism 121.

The pump housing 111He is connected to the radially inner side of the rear member 111Hd so as to be located at the side of the axis of the rotor shaft 111a of the rotary electric machine 111 and supports the rotor shaft 111a via the radial bearing 198 such that the rotor shaft 111a is rotatable. The MOP 11 is connected to the drive shaft 31 that is rotatably supported inside the rotor shaft 111a.

Although not shown in FIG. 3 in details, the MOP 11 is formed of, for example, a general-purpose internal gear pump, an inner rotor is fixed to the drive shaft 31, and an outer rotor is fixed to the pump housing 111He. In this state, the MOP 11 is driven when the drive shaft 31 rotates integrally with the input shaft 121a of the power transmission mechanism 121, that is, the output shaft 101a of the engine 101. Thus, the MOP 11 discharges lubricating oil drawn and strained from the reservoir 111Hp inside the housing 111H to the first distributing oil passage 163, and supplies the lubricating oil to the rotary electric machine 111, the rotary electric machine 112 and the power transmission mechanism 121 via the first supply oil passage 165 or the second supply oil passage 166 for lubrication, and the like.

The power transmission mechanism 121-side end of the drive shaft 31 is inserted in the input shaft 121a, and an internal hollow space 31m communicates with a hollow space 121m inside the input shaft 121a. The end of the hollow space 31m of the drive shaft 31 across from the input shaft 121a communicates with a flow passage 33, thus constituting part of the second supply oil passage 166. The flow passage 33 is formed by attaching a flow passage cover 32 to the external end faces of the rear member 111Hd and pump housing 111He. Communication holes 121h are perforated at multiple portions of the input shaft 121a of the power transmission mechanism 121. The communication holes 121h extend from the outer periphery to the hollow space 121m. The communication holes 121h function as the second supply oil passage 166. Thus, lubricating oil flowing into the hollow space 31m of the drive shaft 31 penetrates via the communication holes 121h or gaps between the members. In this way, lubrication of sliding portions, such as the radial bearings 191, 192, 197, 198, thrust bearings 193, 194, 195, and the like, of the rotary electric machine 111 and power transmission mechanism 121 accommodated inside the housing 111H is ensured. The communication holes 121h that function as the second supply oil passage 166 are provided also in members, and the like, that constitute the ring gear 127 and the pinion gears 129 as needed.

For example, since the gap between the sun gear 126 and the inner faces of the cylindrical portions 183, 184 of the flange-shaped member 181 connects with the hollow space 121m of the input shaft 121a of the power transmission mechanism 121 via the communication holes 121h and functions as the second supply oil passage 166, the radial bearing 197 is supplied with lubricating oil that is fed under pressure from the MOP 11 or the EOP 21 for lubrication. Since an outer surface side space 111mo of the drive shaft 31 in the hollow space 111m inside the rotor shaft 111a functions as the second supply oil passage 166 that is routed from the end of the rotor shaft 111a, the radial bearing 198 is supplied with lubricating oil that is fed under pressure from the MOP 11 or the EOP 21 for lubrication.

Although not particularly described with reference to the drawing, the rotary electric machine 112 has a substantially similar configuration to the rotary electric machine 111, and has such a structure that a rotor shaft united with a rotor inside a stator is rotatably supported by bearings provided at certain positions. As shown in FIG. 2, the bearings provided at certain positions are also similarly supplied with lubricating oil via the first supply oil passage 165.

Each of the rotary electric machines 111, 112 rotates the rotatably supported rotor shaft 111a when magnetic flux that is generated as a result of supply of driving electric power from the above-described battery to the stator coil 116w links the stator core 116c with the rotor core 115c to form a magnetic circuit. At this time, in each of the rotary electric machines 111, 112, since magnetic field varies as alternating-current power is supplied to the stator coil 116w, induced electromotive force is generated due to electromagnetic induction that occurs in the peripheral members including the rotor core 115c around the rotor shaft 111a or the rotor shaft 112a. For this reason, a potential difference can occur between the peripheral members and the rotor shaft 111a or the rotor shaft 112a and, as a result, a closed circuit through which current circulates may be formed.

For example, a current circuit that passes through the rotor shaft 111a to the partition member 111Hc of the housing 111H via the radial bearing 197 or a current circuit that passes through the rotor shaft 111a to the pump housing 111He of the housing 111H via the radial bearing 198 can be formed. In this case, there is a possibility of occurrence of electrolytic corrosion, such as surface roughness, on the bearing surface due to a spark that is developed on the radial bearing 197 or the radial bearing 198.

Incidentally, as described above, lubricating oil that is supplied to the lubricated portions, such as the radial bearings 197, 198, is conceivably effectively utilized to prevent occurrence of electrolytic corrosion in the radial bearings 197, 198, and the like, since lubricating oil has an electrical insulating property, in addition to lubricating and cooling functions. That is, a withstand voltage characteristic against a potential difference that occurs as a result of the above-described electromagnetic induction also varies with the amount of lubricating oil remaining at the lubricated portions, such as the bearing surfaces of the radial bearings 197, 198.

In contrast, with the structure that lubricating oil that is discharged at a constant rate from the MOP 11 is supplied like the radial bearings 197, 198 of the rotary electric machines 111, 112, depending on the operation status of each of the rotary electric machines 111, 112, lubricating oil, for example, may flow out as the lubricating oil on the bearing surfaces, and the like, of the radial bearings 197, 198 is utilized, resulting in a situation that sufficient electrical insulating property is not obtained. This situation similarly occurs also in the case where lubricating oil that is discharged at a constant rate from the EOP 21 is supplied at the time when the vehicle travels in a so-called electric vehicle (EV) mode in which the engine 101 is stopped and only at least one of the rotary electric machines 111, 112 is operated.

When the ECU 1 according to the present embodiment executes various control processes by executing control programs prestored in a memory 2 on the basis of various parameters, the ECU 1 operates the EOP 21 as needed by transmitting a control signal to the EOP 21, thus increasing the supply of lubricating oil.

For example, when the ECU 1 efficiently drives the engine 101 and the rotary electric machines 111, 112 in cooperation with each other on the basis of a torque that is required to output in response to the traveling status of the vehicle 100, the ECU 1 executes the control process (control method) shown in the flowchart of FIG. 5. Particularly, when the ECU 1 determines on the basis of the operating status of each of the rotary electric machines 111, 112 that there is a possibility of occurrence of electrolytic corrosion in the radial bearings 197, 198, and the like, the ECU 1 increases the supply of lubricating oil by driving the EOP 21 under a driving condition different from that of a lubricating oil supply process in a steady state, and prevents occurrence of electrolytic corrosion.

At this time, when the MOP 11 is driven in interlocking with the operating engine 101 while the EOP 21 is stopped, the ECU 1 transmits a control signal for causing the EOP 21 to be driven as an auxiliary pump to start driving the EOP 21 at a preset rotation speed at which the EOP 21 discharges the increased supply of lubricating oil. When the EOP 21 is being driven in synchronization with the operation of at least one of the rotary electric machines 111, 112 while the MOP 11 is stopped during a stop of the engine 101, the ECU 1 transmits a control signal for enhancing lubrication to the EOP 21 to start driving the EOP 21 at a preset rotation speed at which the EOP 21 discharges the increased supply of lubricating oil in addition to the supply of lubricating oil in a steady state. That is, the hydraulic circuit 161 including the MOP 11 and the EOP 21 constitutes a lubrication mechanism according to the present embodiment, the ECU 1 constitutes a control unit, the MOP 11 constitutes a mechanical oil pump, and the EOP 21 constitutes an electric oil pump.

Specifically, the ECU 1 calculates a torque that is required to output from at least one of the rotary electric machines 111, 112 on the basis of the traveling speed of the vehicle 100, a driver's operational request, and the like, and determines an electric power to be supplied to the stator coil 116w, or the like. At this time, the ECU 1 acquires an energization condition, such as a current value of supplied electric power commensurate with the output torque of at least one of the rotary electric machines 111, 112 or an energization carrier frequency that determines the rotation speed, as an operation status, and determines whether there is a possibility of occurrence of electrolytic corrosion in the radial bearings 197, 198, and the like. When the ECU 1 determines that there is a possibility of occurrence of electrolytic corrosion in the radial bearings 197, 198, and the like, the ECU 1 executes electrolytic corrosion preventative process for increasing the supply of lubricating oil by the EOP 21 in parallel. The carrier frequency is a frequency that determines a pulse width modulation period in a pulse width modulation (PWM) control system. It is possible to adjust the rotation speed of each of the rotary electric machines 111, 112 (rotor 115) by adjusting the carrier frequency. In the present embodiment, the case where the rotation speed of each of the rotary electric machines 111, 112 is adjusted with the use of the carrier frequency is described as an example; however, the method of adjusting the rotation speed of each of the rotary electric machines 111, 112 is not limited to this method. Another parameter, such as a duty ratio, may be used instead.

When both a current energization condition that the acquired current value that is supplied to at least one of the rotary electric machines 111, 112 exceeds a current threshold preset in the memory 2 and a frequency energization condition that the carrier frequency at which electric power is supplied to at least one of the rotary electric machines 111, 112 exceeds a carrier threshold preset in the memory 2 are satisfied, the ECU 1 determines that the operation status of at least one of the rotary electric machines 111, 112 can cause electrolytic corrosion to occur in the radial bearings 197, 198, and the like. That is, the ECU 1 constitutes an electrolytic corrosion determination unit. In the present embodiment, the case where affirmative determination that there is a possibility of occurrence of electrolytic corrosion in the radial bearings 197, 198, and the like, is made when both the current energization condition and the frequency energization condition are satisfied is described as an example; however, the method of determining a possibility of occurrence of electrolytic corrosion is not limited to this method. Affirmative determination may be made when only one of the current energization condition and the frequency energization condition is satisfied.

The ECU 1 counts the number of times of affirmative determination that there is a possibility of occurrence of electrolytic corrosion in the radial bearings 197, 198, and the like. When the number of counts exceeds a threshold preset in the memory 2, the ECU 1 permits execution of the electrolytic corrosion preventative process for increasing the supply of lubricating oil. When an elapsed time from the execution of the electrolytic corrosion preventative process exceeds an elapsed time threshold preset in the memory 2, the ECU 1 ends the electrolytic corrosion preventative process, and returns the process to the process of supplying lubricating oil at the time when it is determined that there is no possibility of occurrence of electrolytic corrosion (in a steady state). Thus, the ECU 1 is able to prevent occurrence of electrolytic corrosion while avoiding wasteful frequent execution of the electrolytic corrosion preventative process based on the possibility of damage due to electrolytic corrosion, and is also able to avoid useless continuation of the increased amount of lubricating oil through the electrolytic corrosion preventative process. That is, the ECU 1 constitutes a lubrication control unit.

More specifically, the ECU 1 executes the electrolytic corrosion preventative control process shown in the flowchart of FIG. 5 in accordance with a predetermined sampling period, and initially acquires the current value of electric power supplied and the carrier frequency of electric power supplied as the operation status of each of the rotary electric machines 111, 112 (step S11). The current value of electric power supplied is a first energization condition. The carrier frequency of electric power supplied is a second energization condition.

Subsequently, the ECU 1 determines whether the current value, that is, the first energization condition, of electric power that is supplied to at least one of the rotary electric machines 111, 112 exceeds a set current threshold (step S12). When the current value does not exceed the set current threshold, the ECU 1 proceeds to step S20, and once ends the control process.

Subsequently, after the ECU determines that the current value of electric power that is supplied to at least one of the rotary electric machines 111, 112 exceeds the set current threshold, the ECU 1 further determines whether the carrier frequency, that is, the second energization condition, of electric power that is supplied to at least one of the rotary electric machines 111, 112 exceeds the set carrier threshold (step S13). When the carrier frequency does not exceed the set carrier threshold, the ECU 1 proceeds to step S20, and once ends the control process.

Subsequently, after the ECU 1 determines that the carrier frequency of electric power that is supplied to at least one of the rotary electric machines 111, 112 exceeds the set carrier threshold, the ECU 1 determines that there is a possibility of occurrence of electrolytic corrosion that should be prevented by increasing the supply of lubricating oil to the radial bearings 197, 198, and the like, utilizes a provided counter function, starts up a counter and increments the counter by 1 (step S14).

Figure 6A:
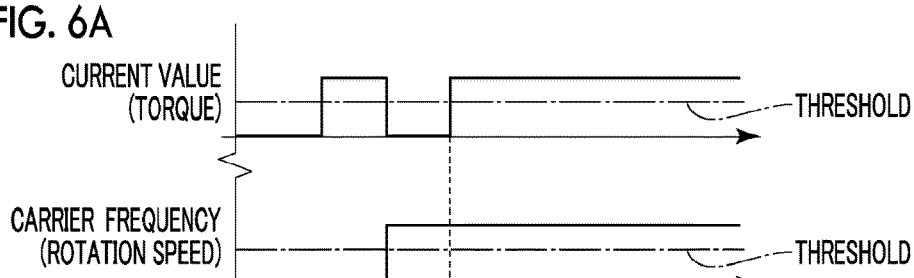
FIG. 6A is a timing chart that illustrates the control process for supplying lubricating oil to the bearings of the rotary electric machines.
Figure 6B:
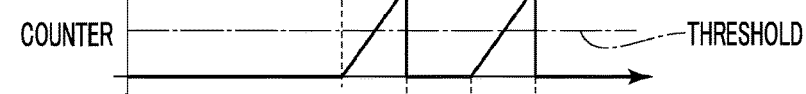
FIG. 6B is a timing chart that illustrates the control process for supplying lubricating oil to the bearings of the rotary electric machines.
Figure 6C:
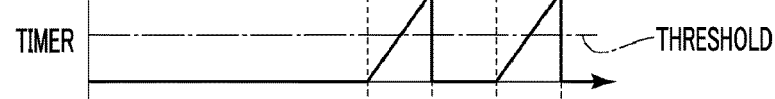
FIG. 6C is a timing chart that illustrates the control process for supplying lubricating oil to the bearings of the rotary electric machines.

At this time, as shown in FIG. 6A to FIG. 6C, when the energization current value that is supplied to each of the rotary electric machine 111, 112 does not exceed the set current threshold or when the energization carrier frequency of electric power supplied does not exceed the set carrier threshold even when the energization current value exceeds the set current threshold, the ECU 1 determines that there is a low possibility of occurrence of electrolytic corrosion that requires the increased supply of lubricating oil, and does not start counting.

Subsequently, the ECU 1 determines whether the number of counts of the counter exceeds the set threshold (step S15). When the number of counts does not exceed the set threshold, the ECU 1 once ends the control process.

Subsequently, after the ECU 1 repeats the above-described step S11 to step S15 at the predetermined sampling period and determines that the number of counts of the counter that counts determination that there is a possibility of occurrence of electrolytic corrosion in the radial bearings 197, 198, and the like, exceeds the set threshold, the ECU 1 executes the electrolytic corrosion preventative process for increasing the supply of lubricating oil by the EOP 21 (step S16-1). At this time, when the EOP 21 is stopped, the ECU 1 starts up the EOP 21 and increases the supply of lubricating oil by driving the EOP 21 at a preset rotation speed, whereas, when the EOP 21 is being driven at a steady rotation speed, the ECU 1 increases the supply of lubricating oil by increasing the rotation speed of the EOP 21 to the preset rotation speed.

Thus, as shown in FIG. 6A to FIG. 6D, it is determined at appropriate timing that the radial bearings 197, 198, and the like, of at least one of the rotary electric machines 111, 112 are placed in an operating situation in an operation state where there is a possibility of occurrence of electrolytic corrosion, and lubricating oil that is supplied to these lubricated portions is increased. As a result, the insulating property on the radial bearings 197, 198, and the like, is improved to such an extent that it is possible to prevent occurrence of electrolytic corrosion due to a spark, or the like.

Subsequently, the ECU 1 utilizes the counter function, starts up a timer, and starts measuring an elapsed time from when the supply of lubricating oil is increased by the EOP 21 (step S17).

Subsequently, the ECU 1 repeatedly determines whether the measured time of the timer that measures the duration of the electrolytic corrosion preventative process that uses the EOP 21 exceeds the set elapsed time threshold (step S18).

Subsequently, after the ECU 1 determines in step S18 that the measured time of the timer exceeds the set elapsed time threshold, the ECU 1 ends the electrolytic corrosion preventative process, and returns the EOP 21 to a driving state before the supply of lubricating oil is increased (step S19-1).

Figure 6D:
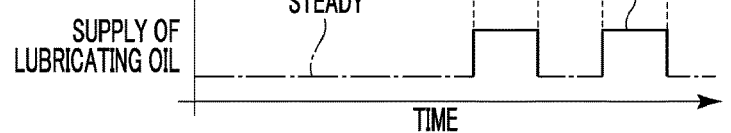
FIG. 6D is a timing chart that illustrates the control process for supplying lubricating oil to the bearings of the rotary electric machines.

Thus, as shown in FIG. 6C and FIG. 6D, it is possible to avoid unnecessary continuation of the increased supply of lubricating oil after the supply of lubricating oil is increased until the electrical insulating property of the radial bearings 197, 198, and the like, of each of the rotary electric machines 111, 112 is recovered and a necessary and sufficient amount of lubricating oil is supplied. As a result, it is possible to prevent useless deterioration of fuel efficiency through electric power consumption, and the like, caused by the driving of the EOP 21.

Subsequently, the ECU 1, for example, resets the counter function utilized as the counter or the timer in preparation to start the next electrolytic corrosion preventative process (step S20), and then once ends the control process.

Therefore, for example, as shown in FIG. 6A to FIG. 6D, when the operation state where there is a possibility of occurrence of electrolytic corrosion in the radial bearings 197, 198, and the like, of at least one of the rotary electric machines 111, 112 is continued, it is determined again that there is a possibility of occurrence of electrolytic corrosion, and the electrolytic corrosion preventative process for increasing the supply of lubricating oil is similarly resumed. Thus, the electrical insulating property at the lubricated portions is maintained.

In this way, the ECU 1 according to the present embodiment is able to appropriately determine whether there is a possibility of occurrence of electrolytic corrosion in the radial bearings 197, 198, and the like, of at least one of the rotary electric machines 111, 112, and, when there is the possibility, the ECU 1 is able to increase the supply of lubricating oil to the lubricated portions, such as the radial bearings 197, 198, with the use of lubricating oil that is discharged from the EOP 21 for only a certain period of time. For this reason, it is possible to prevent occurrence of electrolytic corrosion due to a spark, or the like, by ensuring the electrical insulating property provided by lubricating oil on the radial bearings 197, 198, and the like.

Therefore, the frequency of maintenance of the radial bearings 197, 198, and the like, of each of the rotary electric machines 111, 112 does not increase due to occurrence of electrolytic corrosion, cost is reduced by reducing the number of times of the maintenance, and the quality of rotation of the radial bearings 197, 198, and the like, is ensured.

Figure 7A:
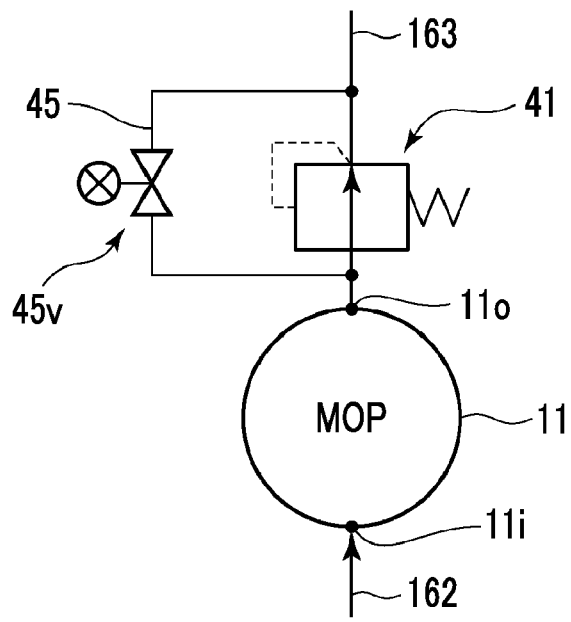
FIG. 7A is a view that shows a rotary electric machine system according to a second embodiment of the disclosure, and is a systematic view that illustrates oil passages for supplying oil to the bearings of the rotary electric machines.
Figure 7B:
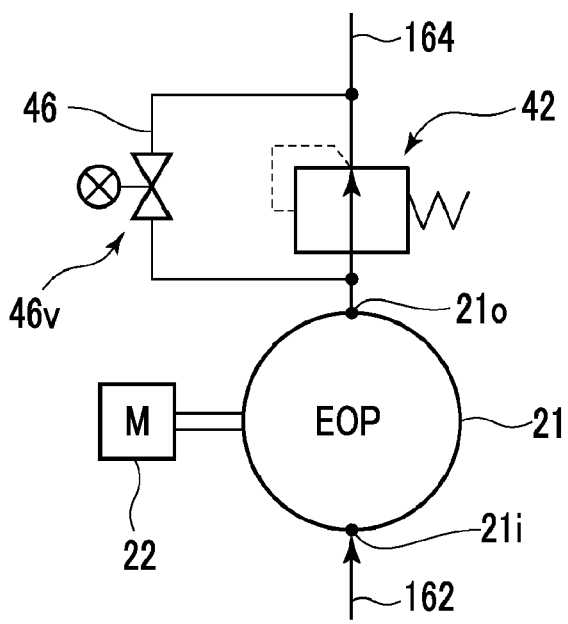
FIG. 7B is a view that shows the rotary electric machine system according to the second embodiment of the disclosure, and is a systematic view that illustrates oil passages for supplying lubricating oil to the bearings of the rotary electric machines.

Next, FIG. 7A, FIG. 7B and FIG. 8 are views that illustrate a rotary electric machine system according to a second embodiment of the disclosure. The configuration of the present embodiment is substantially similar to the configuration of the above-described first embodiment. Like reference numerals denote similar components, so similar description is omitted and a characteristic portion will be described (this also applies to a third embodiment that will be described later).

Second Embodiment

As shown in FIG. 7A and FIG. 7B, a pressure regulating valve 41 is installed on the discharge side of the MOP 11 in the first distributing oil passage 163 of the hydraulic circuit 161 in which the MOP 11 and the EOP 21 are incorporated, and a pressure regulating valve 42 is installed on the discharge side of the EOP 21 in the second distributing oil passage 164 of the hydraulic circuit 161. The pressure regulating valve 41 is set so as to reduce the hydraulic pressure of lubricating oil that is discharged to the first distributing oil passage 163 to a certain pressure in order not to receive the influence of fluctuations in pressure that is discharged from the MOP 11. The pressure regulating valve 42 is set so as to reduce the hydraulic pressure of lubricating oil that is discharged to the second distributing oil passage 164 to a certain pressure in order not to receive the influence of fluctuations in pressure that is discharged from the EOP 21. That is, the pressure regulating valves 41, 42 constitute a pressure reducing valve.

In the hydraulic circuit 161 according to the present embodiment, a bypass oil passage 45 that bypasses the pressure regulating valve 41 is provided in the first distributing oil passage 163, and a bypass oil passage 46 that bypasses the pressure regulating valve 42 is provided in the second distributing oil passage 164. A solenoid valve 45v that is controlled to be driven by the ECU 1 is provided in the bypass oil passage 45. A solenoid valve 46v that is controlled to be driven by the ECU 1 is provided in the bypass oil passage 46.

When the ECU 1 determines that there is a possibility of occurrence of electrolytic corrosion in the radial bearings 197, 198, and the like, and then executes the electrolytic corrosion preventative process by executing the control programs prestored in the memory 2 on the basis of various parameters, the ECU 1 operates at least one of the solenoid valves 45v, 46v as needed by transmitting a control signal to the at least one of the solenoid valves 45v, 46v to switch from a closed state to an open state. The solenoid valve 45v switches the bypass oil passage 45 from the closed state to the open state. The solenoid valve 46v switches the bypass oil passage 46 from the closed state to the open state. Thus, the path of supplying lubricating oil that is discharged from the MOP 11 is switched from the first distributing oil passage 163 to the bypass oil passage 45. Lubricating oil is reduced in pressure by the pressure regulating valve 41 to a predetermined pressure and is supplied to the first distributing oil passage 163. Lubricating oil is allowed to be supplied to the bypass oil passage 45 without being reduced in pressure. The path of supplying lubricating oil that is discharged from the EOP 21 is switched from the second distributing oil passage 164 to the bypass oil passage 46. Lubricating oil is reduced in pressure by the pressure regulating valve 42 to a predetermined pressure and is supplied to the second distributing oil passage 164. Lubricating oil is allowed to be supplied to the bypass oil passage 46 without being reduced in pressure. That is, the solenoid valves 45v, 46v constitute a switching unit.

For example, the ECU 1 is configured to drive one or both of the solenoid valves 45v, 46v at the time when it is determined that there is a possibility of occurrence of electrolytic corrosion by executing the control process (control method) shown in the flowchart of FIG. 8. Thus, by supplying lubricating oil that is discharged from the operating MOP 11 via the bypass oil passage 45 or the operating EOP 21 via the bypass oil passage 46, it is possible to increase the supply of lubricating oil to the radial bearings 197, 198, and the like, where there is a possibility of occurrence of electrolytic corrosion. That is, the first distributing oil passage 163 and the second distributing oil passage 164 constitute a first oil passage, and the bypass oil passages 45, 46 constitute a second oil passage.

More specifically, as in the case of the above-described embodiment, the ECU 1 acquires the current value (first energization condition) and carrier frequency (second energization condition) of electric power supplied as the operation status of each of the rotary electric machines 111, 112 (step S11). When the current value exceeds the set current threshold (step S12), and when the carrier frequency exceeds the set carrier threshold (step S13), the ECU 1 determines that there is a possibility of occurrence of electrolytic corrosion and increments the counter by 1 (step S14).

After that, when the number of counts of the counter exceeds the set threshold (step S15), the ECU 1 according to the present embodiment opens the bypass oil passage 45 by driving the solenoid valve 45v for the operating MOP 11 or the bypass oil passage 46 by driving the solenoid valve 46v for the operating EOP 21, thus executing the electrolytic corrosion preventative process for increasing the supply of lubricating oil to the radial bearings 197, 198, and the like, where there is a possibility of occurrence of electrolytic corrosion (step S16-2).

Thus, as in the case of the above-described embodiment, the insulating property on the radial bearings 197, 198, and the like, is improved to such an extent that it is possible to prevent occurrence of electrolytic corrosion due to a spark, or the like.

Subsequently, the ECU 1 starts up the timer and starts measuring an elapsed time from when the supply of lubricating oil is increased (step S17). When the measured time of the timer exceeds the set elapsed time threshold (step S18), the ECU 1 closes the bypass oil passage 45 by stopping the driving of the solenoid valve 45v or closing the bypass oil passage 46 by stopping the driving of the solenoid valve 46v, thus returning the supply of lubricating oil from the MOP 11 or the EOP 21 to the supply of lubricating oil before the supply of lubricating oil is increased, that is, the time when it is determined that there is no possibility of occurrence of electrolytic corrosion (in a steady state) (step S19-2), and then resets the counter and the timer (step S20), after which the ECU 1 once ends the control process.

In this way, the ECU 1 according to the present embodiment, as in the case of the above-described embodiment, is able to supply the increased amount of lubricating oil while the hydraulic pressure of lubricating oil that is discharged from the MOP 11 or the EOP 21 remains unchanged when the ECU 1 determines that there is a possibility of occurrence of electrolytic corrosion in the radial bearings 197, 198, and the like, of at least one of the rotary electric machines 111, 112. As a result, the electrical insulating property of lubricating oil on the radial bearings 197, 198, and the like, is ensured, so cost is reduced and the quality of rotation is ensured.

Third Embodiment

Figure 9:
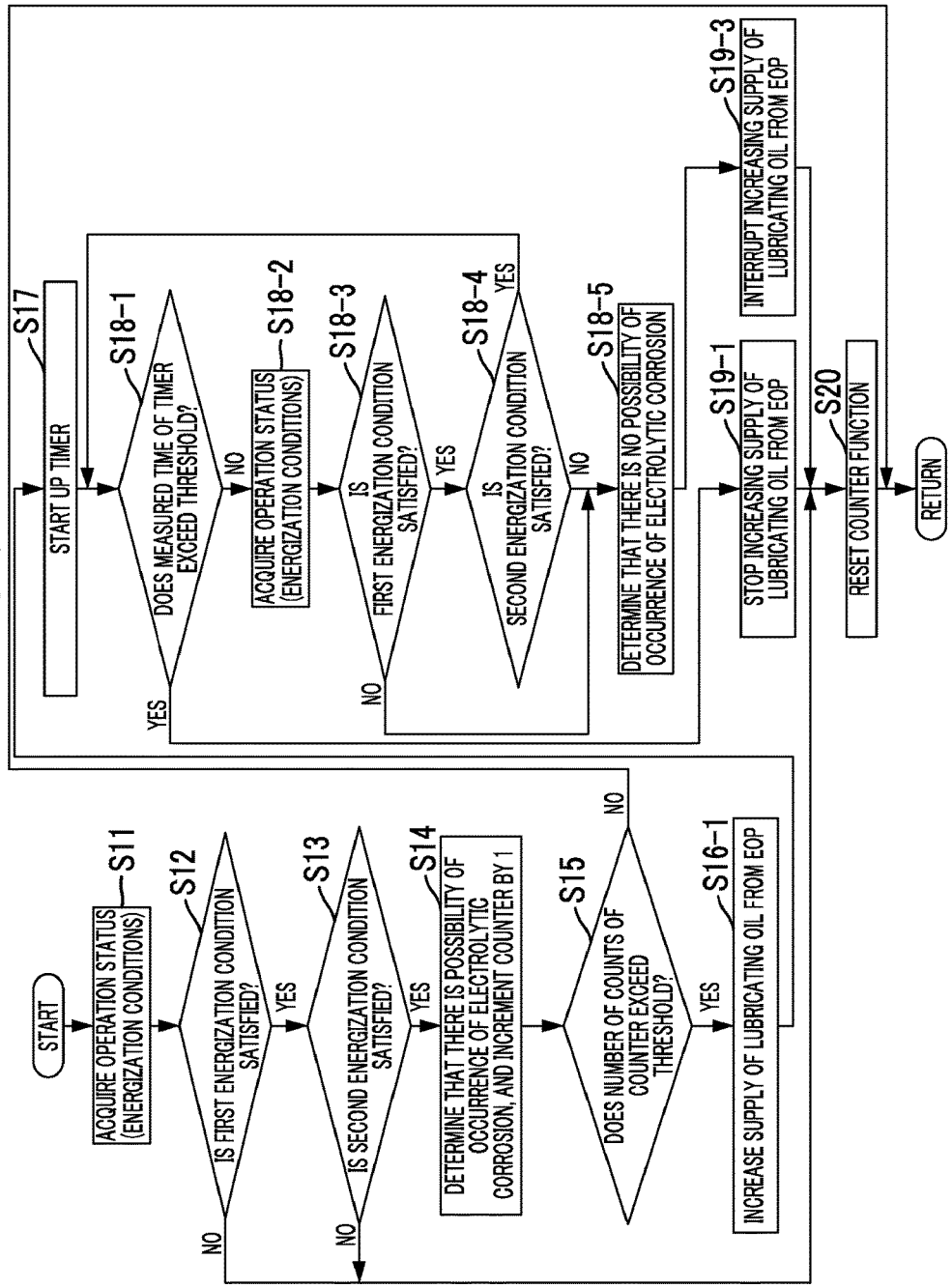
FIG. 9 is a view that shows a rotary electric machine system according to a third embodiment of the disclosure, and is a flowchart different from that of FIG. 5 or FIG. 8 and illustrates a control process for supplying lubricating oil to the bearings of the rotary electric machines.

Next, FIG. 9 is a flowchart that illustrates a rotary electric machine system according to a third embodiment of the disclosure. The case where the configuration of the present embodiment is substantially similar to the configuration of the above-described first embodiment will be described as an example; however, the configuration of the present embodiment is not limited to this configuration. Of course, the configuration of the present embodiment may be applied to the second embodiment. As shown in FIG. 9, the ECU 1 executes processes similar to step S11 to step S13 in parallel with step S18 according to the above-described first embodiment in which the ECU 1 repeatedly determines whether the elapsed time from when the supply of lubricating oil is increased, which is measured by the timer, exceeds the set elapsed time threshold. When the ECU 1 does not determine that there is a possibility of occurrence of electrolytic corrosion, the ECU 1 interrupts the process of increasing the supply of lubricating oil and restricts the supply of lubricating oil.

Specifically, the ECU 1 executes control process (control method) similar to that of the above-described first embodiment, acquires the current value (first energization condition) and carrier frequency (second energization condition)

of electric power supplied as the operation status of each of the rotary electric machines 111, 112 (step S11). When the current value exceeds the set current threshold (step S12) and when the carrier frequency exceeds the set carrier threshold (step S13), the ECU 1 determines that there is a possibility of occurrence of electrolytic corrosion and increments the counter by 1 (step S14).

Subsequently, when the number of counts of the counter exceeds the set threshold (step S15), the ECU 1 executes the electrolytic corrosion preventative process for increasing the supply of lubricating oil from the EOP 21 (step S16-1).

Subsequently, after the ECU 1 starts up the timer and starts measuring the elapsed time from when the supply of lubricating oil is increased (step S17), the ECU 1 determines whether the elapsed time from when the supply of lubricating oil, which is measured by the timer, exceeds the set elapsed time threshold (step S18-1).

After that, the ECU 1 according to the present embodiment, as well as step S11 to step S13, acquires the first energization condition and second energization condition of electric power that is supplied to each of the rotary electric machines 111, 112 (step S18-2), determines whether the current value continuously exceeds the set current threshold (step S18-3), and further determines whether the carrier frequency also continuously exceeds the set carrier threshold (step S18-4).

After the ECU 1 determines in these step S18-2 to step S18-4 that both of the energization conditions exceed the corresponding thresholds, the ECU 1 returns to step S18-1 and repeats a similar process. When the ECU 1 determines that the measured elapsed time from when the supply of lubricating oil is increased exceeds the set elapsed time threshold, the ECU 1 proceeds to step S19-1 in the above-described embodiment, ends the electrolytic corrosion preventative process, and returns the EOP 21 to a driving state before the supply of lubricating oil is increased.

After the ECU 1 determines in step S18-2 to step S18-4 that both of the energization conditions do not exceed the corresponding thresholds, the ECU 1 determines that there is a low possibility of occurrence of electrolytic corrosion (step S18-5), and interrupts the electrolytic corrosion preventative process and returns the EOP 21 to a driving state before the supply of lubricating oil is increased (step S19-3).

Subsequently, the ECU 1, for example, resets the counter function utilized as the counter and the timer in preparation to start the next electrolytic corrosion preventative process (step S20), and then once ends the control process.

Thus, after it is determined that there is a low possibility of occurrence of electrolytic corrosion, it is possible to immediately stop the increased supply of lubricating oil, so it is possible to eliminate deterioration of fuel efficiency resulting from an unnecessarily increased amount of lubricating oil.

In this way, in addition to the operation and advantageous effects obtained from the above-described embodiments, when it is not determined that there is a possibility of occurrence of electrolytic corrosion in the radial bearings 197, 198, and the like, of each of the rotary electric machines 111, 112, the ECU 1 according to the present embodiment is able to avoid unnecessary continuation of the electrolytic corrosion preventative process for increasing the supply of lubricating oil. As a result, it is possible to prevent useless deterioration of fuel efficiency through electric power consumption, and the like, caused by the driving of the EOP 21.

In an alternative embodiment to the above-described embodiments, it is determined whether there is a possibility of occurrence of electrolytic corrosion by comparing each of the current energization condition and frequency energization condition with the corresponding fixed current threshold and carrier threshold in the above-described embodiments; however, a method of determining whether there is a possibility of occurrence of electrolytic corrosion is not limited to this method.

Figure 10:
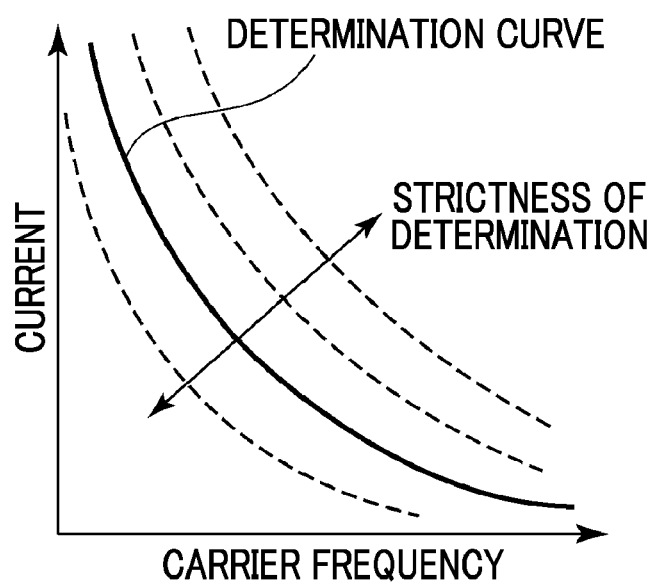
FIG. 10 is a view that illustrates an alternative embodiment to the embodiments, and is a graph that shows a map that is used at the time of determining the timing at which lubricating oil is supplied to the bearings of the rotary electric machines.

For example, in a first alternative embodiment, as indicated by the continuous line in FIG. 10, a determination curve map that uses the current threshold and the carrier threshold as parameters may be prestored in the memory 2. The ECU 1 may acquire the energization current value and the energization carrier frequency, and may determine whether there is a possibility of occurrence of electrolytic corrosion on the basis of whether the energization conditions exceed the determination curve in the map. As indicated by the dashed lines in FIG. 10, a plurality of types of determination curves may be stored in the memory 2 so as to be selectable in accordance with the strictness of determination.

In a second alternative embodiment, although not shown in the drawing, instead of comparing the energization current value corresponding to the output torque that is required from at least one of the rotary electric machines 111, 112 with the current threshold, a torque threshold is stored in the memory 2 such that the output torque is directly usable. The ECU 1 is able to determine whether there is a possibility of occurrence of electrolytic corrosion on the basis of whether the acquired output torque exceeds the torque threshold.

In a third alternative embodiment, although not shown in the drawing, instead of comparing the energization carrier frequency corresponding to the rotation speed that is required from at least one of the rotary electric machines 111, 112 with the carrier threshold, a speed threshold is stored in the memory 2 such that the rotation speed is directly usable. The ECU 1 is able to determine whether there is a possibility of occurrence of electrolytic corrosion on the basis of whether the acquired rotation speed exceeds the speed threshold.

The embodiments of the disclosure are described; however, it is obvious to persons skilled in the art that the embodiments may be modified without departing from the scope of the disclosure. All of such modifications and equivalents thereof are intended to be included in the appended claims.

What is claimed is:

1. A rotary electric machine system comprising:
a rotary electric machine including a stator and a rotor, a rotor shaft fixed to the rotor being rotatably supported by a case via a bearing;
a lubrication mechanism configured to supply lubricating oil to the bearing of the rotary electric machine; and
a control unit configured to control the supply of lubricating oil from the lubrication mechanism, wherein
the control unit is configured to acquire an operation status of the rotary electric machine and determine whether there is a possibility of occurrence of electrolytic corrosion in the bearing, and
the control unit is configured to, when it is determined that there is a possibility of occurrence of electrolytic corrosion, increase the supply of lubricating oil to the bearing by controlling the lubrication mechanism as compared to the supply of lubricating oil to the bearing at a time when it is not determined that there is a possibility of occurrence of electrolytic corrosion.

2. The rotary electric machine system according to claim 1, wherein the rotary electric machine is mounted on a vehicle together with an internal combustion engine as a power source, the lubrication mechanism includes an electric oil pump that is able to supply lubricating oil to the bearing, and the control unit is configured to increase the supply of lubricating oil to the bearing by controlling a rotation speed of the electric oil pump.

3. The rotary electric machine system according to claim 1, wherein the rotary electric machine is mounted on a vehicle together with an internal combustion engine as a power source, the lubrication mechanism includes an oil pump that is able to supply lubricating oil to the bearing, the lubrication mechanism includes a first oil passage in which a pressure reducing valve is interposed, a second oil passage that bypasses the pressure reducing valve, and a switching unit configured to open or close the second oil passage, on a discharge side of the oil pump, and the control unit is configured to increase the supply of lubricating oil to the bearing by switching from a state where the second oil passage is closed by the switching unit and the first oil passage is used as a path for supplying lubricating oil to a state where the second oil passage is used as a path for supplying lubricating oil.

4. The rotary electric machine system according to claim 1, wherein the control unit is configured to measure an elapsed time from when the supply of lubricating oil to the bearing is increased, and the control unit is configured to, when the elapsed time exceeds a preset elapsed time threshold, return the supply of lubricating oil to the bearing to the supply of lubricating oil before the supply of lubricating oil is increased.

5. The rotary electric machine system according to claim 1, wherein the control unit is configured to, when it is not determined that there is a possibility of occurrence of electrolytic corrosion after the supply of lubricating oil to the bearing is increased, return the supply of lubricating oil to the bearing to the supply of lubricating oil before the supply of lubricating oil is increased.

6. The rotary electric machine system according to claim 1, wherein the control unit is configured to acquire an output torque of the rotary electric machine as the operation status of the rotary electric machine, and the control unit is configured to, when the output torque exceeds a preset torque threshold, determine that there is a possibility of occurrence of electrolytic corrosion in the bearing.

7. The rotary electric machine system according to claim 1, wherein the control unit is configured to acquire a current value that is supplied to the rotary electric machine or a rotation speed of the rotary electric machine as the operation status of the rotary electric machine, and the control unit is configured to, when the current value exceeds a preset current threshold or when the rotation speed exceeds a preset speed threshold, determine that there is a possibility of occurrence of electrolytic corrosion in the bearing.

\* \* \* \* \*